3,832,205
PIGMENTS OF SUBSTANTIALLY TERNARY SYSTEM HAVING OXIDES OF COLUMBIUM AND TRANSITIONAL ELEMENTS
Harold E. Lowery, Garfield Heights, Ohio, assignor to Ferro Corporation, Cleveland, Ohio
No Drawing. Filed Apr. 5, 1973, Ser. No. 348,099
Int. Cl. C08h 17/04
U.S. Cl. 106—288 B          14 Claims

ABSTRACT OF THE DISCLOSURE

Pigments are disclosed comprising a substantially ternary system including a rutile-type supporting lattice and oxides of columbium and a transitional element selected from the group consisting of nickel, chromium, cobalt, manganese, vanadium, and mixtures thereof. The molar ratios of the oxides of columbium and the transitional element may vary much more widely than previously thought possible for added components while still obtaining stable pigments having acceptable color strength and durability. In a preferred form, the pigments comprise ternary oxide system having titania as the rutile-type supporting lattice and are free of heavy metals like lead, antimony, mercury, and the like. Optionally, the rutile-type supporting lattice may be replaced in part by an oxide of barium, magnesium, strontium, zinc, calcium or mixtures thereof.

BACKGROUND OF THE INVENTION

Pigments are used in many industries to impart color to various products, for example, in products like porcelain enamel, glazes, stains, plastics, paints, lacquers, rubber, paper, and the like. Previously, oxides of heavy metals such as lead, antimony, mercury, cadmium, selenium, arsenic, etc., have been used in pigments in appreciable amounts. However, with the ever increasing awareness of environmental results of the use of such oxides and their possible toxic effect on the ecology when employed excessively, the continued use of oxides, of heavy metals is becoming less popular. Indeed, there is reason to believe that statutory controls on their use may eventually be introduced. For example, because of the appeal of dried chips of paint to small children who are attracted to the paint chips like candy, the amount of lead oxide in paints may be limited to extremely small amounts of the order of one weight percent or less.

Quite apart from the matter of the presence or absence of toxicity in pigments, the art has previously thought that in pigments of the rutile-type it was essential that the color-inducing metal oxides added to the lattice be present in such an amount that the ratio of the sum of the added cations to the sum of the added anions is 1:2. This is equivalent to requiring the added metal oxides that are used to be present in equal molar amounts. For example, one mole of NiO combines with one mole of $Sb_2O_5$ to form one mole of an an antimony pigment, $NiSb_2O_6$. The ratio of the sum of the added cations to the sum of the added anions is 3:6 or 1:2. It was also thought that the ionic radii of metal oxides added to a lattice could not exceed a predetermined value as dictated by the open area in the supporting lattice on the apparent logical ground that the lattice physically could not otherwise receive or accommodate the added oxides if they were larger than the openings in the lattice.

Such prior teachings are exemplified by U.S. Pat. 3,022,186 to Hund and U.S. Pat. 3,091,544 to Hund et al. Both patents disclose that the additional or guest components incorporated into the lattice must be present in such proportions relative to one another that the ratio of the sum of the added cations to the sum of the added anions is substantially 1:2 in order to preserve the statistical electroneutrality in the lattice. This amounts to an equal molar ratio of the oxide additions used as shown in column 5 of the Hund Pat. 3,022,186. Further, these patents disclose that the cations of the added or guest components must possess radii which are comparable with the radii of the metal ions or the statistical mean of the radii of the metal ions in the host lattice. In particular, Pat. 3,022,186 discloses that the cations of the additional components should possess radii between 0.46 A and 0.91 A. Pat. 3,091,544 discloses that the cations of the additional components to the lattice should have radii between 0.23 A. and 0.98 A.

SUMMARY OF THE INVENTION

The present invention relates to a pigment which comprises substantially a ternary system containing a rutile-type lattice, preferably titania, and color-inducing metal oxides within the lattice consisting essentially of an oxide of columbium (niobium) and an oxide of a transitional element selected from the group consisting of nickel, chromium, cobalt, manganese, vanadium, and mixtures thereof. Each of the transitional elemental oxides provides a different color in combination with the rutile-type lattice and columbium oxide. It has also been found that the molar ratio of the columbium oxide to the transitioinal elemental oxide can vary widely and still obtain stable pigments having acceptable color strength and durability. For example, the molar ratio of the oxide of columbium to the oxide of the transitional element may be within the range of about 0.2 to about 5.

Up to about 20 weight percent of the more expensive rutile-type lattice, especially titania, can be replaced by an oxide of barium, magnesium, strontium, zinc, calcium, and mixtures thereof to provide, in effect, a quaternary system. Compounds of at least three of these metals, barium, strontium, and calcium were previously considered inapplicable for use with a rutile-type lattice. The compounds of barium, strontium, and calcium, have ion radii that are not comparable with those of the host lattice, and such compounds were also thought to have unfavorable thermostability.

In the preferred form, the present pigments comprise a substantially ternary metal oxide system in which a metal oxide forming the rutile-type lattice is not of a heavy metal like antimony, mercury, and the like. The preferred lattice is that of the rutile form of titania. In this manner, the pigments themselves are entirely free of heavy metals and can be used where heavy metals cannot be tolerated because of their inherent toxicity or safety requirements.

The pigments are prepared by calcining a mixture of selected components in sufficient proportions to convert them or otherwise provide the form and amount desired of the rutile lattice and the oxides of columbium and a defined transitional element in the ultimate pigment.

DESCRIPTION OF THE PREFERRED EMBODIMENTS

The pigments of the present invention comprise a substantially ternary system comprising a rutile-type supporting lattice, and color-inducing metal oxides consisting essentially of an oxide of columbium (niobium) and an oxide of a transitional element selected from the group consisting of nickel, chromium, cobalt, manganese, vanadium, and mixtures thereof. The relative amounts of the oxides of columbium and the transitional element may vary within an unexpectedly wide range, namely, within the molar range of about 0.2 to about 5 of columbium oxide to transitional elemental oxide, respectively. Partial replacement of the rutile-type structure can be made with other metal oxides. The pigments are prepared by calcination.

Considering initially the components of the pigments, while "rutile" commonly means a known structure of titania, the term is also recognized in the art to refer to a type of crystal lattice like that resulting from calcination of $TiO_2$. This lattice consists of a tetragonal elementary cell with two molecules of specified metal dioxides or difluorides, the oxygen of fluorine ions being arranged in a distorted oxtahedron around the metal ions. As disclosed in Hund U.S. Pat. 3,022,186, by a suitable combination of trivalent and pentavalent metal oxides instead of dioxides, rutile lattices in which two metal ions of different valency are statistically distributed are formed. Also, a trirutile or polyrutile lattice, instead of the normal rutile lattice, may be formed by combining a suitable monovalent or divalent metal oxide with three molecules and one molecule, respectively, of metal pentoxide.

Host components which form the rutile-type or polyrutile-type lattice and which, therefore, are contemplated here and in the claims by the phrase "rutile-type" lattice, include in particular the following: $TiO_2$, $SnO_2$, $\beta$-$MnO_2$, $PbO_2$, $VO_2$, $GeO_2$, $TeO_2$, $CrO_2$, $RuO_2$, $OsO_2$, $IrO_2$, $MgF_2$, $ZnF_2$, $MnF_2$, $FeF_2$, $CoF_2$, $NiF_2$, $PdF_2$, $LiSb_3O_8$, $MgSb_2O_6$, $ZnSb_2O_6$, $FeSb_2O_6$, $CoSb_2O_6$, $NiSb_2O_5$, $CuSb_2O_6$, $AlSbO_4$, $GaSbO_4$, $VSbO_4$, $CrSbO_4$, $FeSbO_4$, $RhSbO_4$, $MgTa_2O_6$, $NiTa_2O_6$, $CoTa_2O_6$, $FeTa_2O_6$, $CrTaO_4$, $FeTaO_4$, $RhTaO_4$, $CrNbO_4$, $FeNbO_4$, $RhNbO_4$, and $RhVO_4$. Titania is preferred as a rutile component, since its use results in excellent pigments which are also free of heavy metals like lead, antimony, mercury, cadmium, selenium, arsenic, etc.

As indicated, the color-inducing oxides consist essentially of an oxide of columbium and an oxide of a transitional element selected from the group consisting of nickel, chromium, cobalt, manganese, vanadium, and mixtures thereof, the oxides of columbium and the transitional element being present, respectively, in a molar ratio within the range of about 0.2 to about 5. The prior art as exemplified by Hund U.S. Pats. 3,022,186 and 3,091,544 regarded as essential that the addition of oxides to a supporting lattice be in such relative amounts that the ratio of the sum of the added cations to the sum of the added anions was substantially 1:2. It was thought that a margin of error of only ±2% from this ratio could be tolerated. The indicated Hund ratios of the added cations to the added anions can also be stated as an equal molar ratio of the added components as shown by Hund Pat. 3,022,186, column 5.

Contrary to the foregoing, it has been found that in the present pigments in which columbium oxide is a component common to all forms, the molar ratio of an oxide of columbium to an oxide of a transitional element as defined can vary widely, for example, in the molar range of about 0.2 to about 5. Pigments of the present invention have color-inducing oxides present in molar ranges that substantially deviate from an equal molar ratio, as taught by Hund, and yet are highly acceptable.

It is within the contemplation of the present invention to replace at least part of the rutile-type component with a metal oxide to effect substantially a quaternary system. Titania, for example, is fairly expensive. It has been found that up to about 20% of the rutile-type component can be replaced by an oxide of barium, magnesium, strontium, zinc, calcium, and mixtures thereof without losing appreciably the advantages of the present pigments. Strontium is preferred. The use of oxides in this manner of at least barium, strontium, and calcium is especially surprising, since compounds of these metals were previously regarded as unsatisfactory in pigments of a rutile-type lattice. U.S. Pat. 3,022,186 to Hund, column 3, lines 16 to 24, for example, specifically mentions the inapplicability of compounds of barium, strontium, and calcium for use in making mixed phases according to the disclosure of that patent, since such compounds have probably unfavorable thermostability and, more particularly, their ion radii are not comparable with those of the host or lattice components.

The pigments are prepared by co-calcination of a mixture of the defined components when comminuted or of compounds which upon calcination produce the defined components. Temperatures for calcination are not critical and depend on the components chosen. As a rule, calcination can take place between about 800° F. to about 2400° F., although more likely the calcination is within the range of about 1600° F. to about 2100° F. Heating is continued within the calcination temperature range until the desired pigment composition is obtained. The time is largely determined by the size of the batch being calcined and may range for about 4 to about 8 hours for batches of about 8 to about 12 pounds. If desired, small amounts of a flux, such as potassium fluoride, can be added to the batch recipe.

While it is possible to begin with the oxide or other form of the components desired in the ultimate calcined pigments, it is more convenient to use compounds which on calcination yield the oxides or other forms desired. Accordingly, for the calcination of any of the metals previously indicated as useful in the present pigments, the following compounds of such metals may be used as a starting batch material when conversion to the oxide or other desired form occurs at the calcination temperatures employed: the carbonates, nitrates, sulfates, sulfides, chlorides, acetates, perchlorates, hypochlorites, formates, iodates, oxalates, hypophosphites, sulfides, tartrates, hydroxides, etc.

All components forming part of the batch are preferably comminuted to provide intimate mixture. Particle size is not critical although as a rule the finer the particle size the more intimate the mixture. The average particle size for the batch components may range from about 0.1 micron to about 10 microns. A more usual range for an average particle size is about 1 micron to about 5 microns. In lieu of a dry batch, solutions or aqueous suspensions or sols of the components, from which the components are converted to a desired form, may also be used.

The exact chemical reaction, if any, which takes place during calcination is not fully understood. Some authorities are of the opinion that solid solutions are formed. Still others refer to the formation of titanates when titania, for example, is one of the components of the pigments. The appended claims defining the present pigments are intended to include whatever results from the calcination of the components as hereinbefore defined.

Relative proportions between the rutile-type lattice and the color-inducing oxides may vary widely, the relative proportions of the color-inducing oxides inter se being within the molar range previously described, namely, within the range of about 0.2 to about 5, columbium oxide to transitional elemental oxide, respectively. Improved pigments are obtained when an oxide of columbium and an oxide of a transitional element are present in a molar ratio of about 0.2 to about 0.8 mole of columbium oxide per mole of transitional elemental oxide; and also in a molar ratio of about one mole of columbium oxide per 0.8 to about 0.2 mole of transitional elemental oxide.

The pigments may comprise in weight percent from about 99% rutile-type lattice component and 1% color-inducing oxides to about 1% rutile-type lattice component and 99% color-inducing oxides. However, as little as 1% color-inducing oxides results in a pastel shade of color, while as much as 99% of the color-inducing oxides is wasteful. Normally, the pigment comprises in weight percent from about 70% to about 90% rutile-type lattice component and from about 10% to about 30% of the color-inducing oxides, a composition of about 80% lattice component and about 20% of the color-inducing oxides being preferred.

As used here and in the claims, the term "color-inducing metal oxides" includes columbium oxide and one or more of the transitional elemental oxides of the class previously defined which produce variations in color in the pigments. For example, the joint use of columbium oxide and nickel oxide with rutile produce a yellow pigment; the joint use of columbium oxide and chromium oxide with rutile, an orange pigment; columbium oxide and cobalt oxide with rutile, a buff orange pigment; columbium oxide and manganese oxide with rutile, a maroon pigment; and columbium oxide and vanadium oxide with rutile, a black pigment. As one uses lesser amounts of either the oxide of columbium or the oxide of a transitional element with respect to the other, the lighter or pastel shades of color result.

The present pigments are conventionally incorporated into a medium to which the color of the pigment is to be imparted. Thus, the pigments are directly mixed with the other ingredients of paint or other like decorative coatings. Or the pigments may be mixed with plastics, particularly thermoplastics, prior to molding the plastics into a desired form. The pigments may be similarly incorporated into many other media to which color is to be imparted.

Previously, the color of pots and pans as used in kitchens, especially the insides of such containers, has been limited to white and off-white colors, because titania-based pigments are generally regarded as safe for directly contacting food intended for human consumption, and titania-based pigments usually impart a white color. The use of non-white pigments has been discouraged in such kitchen-oriented products because of possible toxicity. By means of the present pigments which include non-toxic, titania-based pigments, various color variations other than white are possible for attractively coloring pots and pans, eating tools, and the like. The present pigments can be directly incorporated in any plastic, metal or metal alloy that is then fabricated to a desired utensil. As used here and in the claims, the term "food utensil" is taken to mean any tool designed directly to contact food intended for human consumption, such as pots, pans, boilers, eating and cooking implements like spoons, knives, forks, and the like.

The following examples are intended only to illustrate the invention and should not be construed to impose limitations on the claims. Parts are by weight percent unless otherwise indicated.

EXAMPLES 1 THROUGH 5

Three yellow pigments of the present invention were conventionally prepared from the following recipes given in weight percent in Table A. All elements were present in the resulting pigments as oxides as a result of the calcination. The lowermost lines of table A indicate the molar ratios of the compounds of the indicated elements that were added to the titania rutile supporting lattice.

TABLE A

| Example | 1 | 2 | 3 |
|---|---|---|---|
| $TiO_2$ | 80.0 | 80.00 | 71.30 |
| $NiCO_3$ | 6.5 | 7.28 | 7.48 |
| $Cb_2O_5$ | 13.5 | 12.52 | 12.52 |
| $SrCO_3$ | | | 8.70 |
| Molar ratio: | | | |
| Ni:Cb | 1:1 | 1:0.8 | |
| Ni:Cb:Sr | | | 1:0.8:1 |

The resulting pigments of Examples 1 through 3, as well as those of other examples hereinafter described, were prepared for determination of tristimulus values in the following manner. An amount of 1.5 grams of a pigment was combined with 1.5 grams of rutile titania (letdown), and 10 cc. of litho varnish. The combination was then mixed on a conventional Hoover muller for 25 revolutions, after which the resulting paste was centered on one of the plates of the Hoover muller and the muller operated for 25 additional revolutions. A sample of the resulting paste was then placed on a Morest card and a draw-down bar passed over the card to leave a layer of the test pigment of uniform thickness.

The conventional tristimulus values X, Y and Z for the pigment samples on the Morest cards, as well as for other examples hereinafter given, were obtained by standard procedures based on spectrophotomeric data. From the tristimulus values, the known Hunter values were based as follows:

L is a measure of the reflectance, $L = 100 Y^{1/2}$;
a is a measure of the redness-greenness, $$a = \frac{175 \ (1.02 \ X - Y)}{Y^{1/2}}$$

b is a measure of the yellowness-blueness, $$b = \frac{70 \ (Y - 0.847 \ Z)}{Y^{1/2}}$$

$$x = \frac{X}{X+Y+Z};$$

and $$y = \frac{Y}{X+Y+Z},$$

x and y being the trichromatic coefficients.

Table B provides these data for the pigments for Examples 1, 2 and 3 as well as comparative data for two additional, commercially available pigments, namely, Examples 4 and 5. Pigments of Examples 4 and 5 consist essentially of about 80% titania in combination with antimony and nickel oxides. The values for L, −a, and +b were read from a Hunter color difference meter.

TABLE B

| Example: | X | Y | Z | x | y | L | −a | +b |
|---|---|---|---|---|---|---|---|---|
| 1 | 0.7340 | 0.8037 | 0.4667 | 0.3662 | 0.4010 | 88.7 | 7.8 | 30.3 |
| 1 | 0.7322 | 0.8051 | 0.4673 | 0.3653 | 0.4016 | 89.6 | 8.7 | 31.0 |
| 3 | 0.7320 | 0.8076 | 0.5744 | 0.3635 | 0.4010 | 89.5 | 9.1 | 30.7 |
| 4 | 0.7529 | 0.8266 | 0.5490 | 0.3537 | 0.3883 | 91.2 | 9.0 | 26.9 |
| 5 | 0.7375 | 0.8133 | 0.4791 | 0.3633 | 0.4007 | 89.9 | 9.2 | 30.5 |

The pigments of Examples 1 through 3 all gave good yellow color. Those of Examples 2 and 3 were better than that of Example 1 due to the higher chromaticity values, that is, the values of −a(green) and +b(yellow). The pigments of Examples 1 through 3 are appreciably better than the antimony pigment of Example 4, since their +b(yellow) values are considerably higher. The pigments of Examples 1 through 3 are also better than the antimony pigment of Example 5.

EXAMPLES 6 THROUGH 11

Another batch of pigments was prepared from the following recipes given in weight percent in Table C. As before, the lowermost line of Table C shows the molar ratios of the compounds of the indicated elements that were added to the titania-rutile supporting lattice.

TABLE C

| Example | 6 | 7 | 8 | 9 | 10 | 11 |
|---|---|---|---|---|---|---|
| $TiO_2$ | 80.0 | 80.0 | 80.0 | 80.0 | 80.0 | 80.0 |
| $NiCO_3$ | 3.2 | 4.38 | 5.54 | 7.48 | 9.18 | 10.88 |
| $Cb_2O_5$ | 16.8 | 15.62 | 14.46 | 12.52 | 10.82 | 9.12 |
| Molar ratio: Ni:Cb | 0.4:1 | 0.6:1 | 0.8:1 | 1:0.8 | 1:0.6 | 1:0.4 |

Table D provides the tristimulus, Hunter values and trichromatic coefficients for these examples.

TABLE D

| Example: | X | Y | Z | x | y | L | −a | +b |
|---|---|---|---|---|---|---|---|---|
| 6 | 0.7712 | 0.8437 | 0.5541 | 0.3555 | 0.3889 | 91.7 | 8.1 | 27.5 |
| 7 | 0.7749 | 0.8507 | 0.5377 | 0.3582 | 0.3932 | 92.4 | 8.5 | 28.9 |
| 8 | 0.7846 | 0.8622 | 0.5247 | 0.3613 | 0.3970 | 92.9 | 8.6 | 30.5 |
| 9 | 0.7686 | 0.8472 | 0.4938 | 0.3643 | 0.4015 | 91.9 | 8.9 | 31.5 |
| 10 | 0.7792 | 0.8532 | 0.5287 | 0.3605 | 0.3947 | 92.3 | 8.1 | 9.76 |
| 11 | 0.7313 | 0.8044 | 0.5035 | 0.3586 | 0.3944 | 89.9 | 8.7 | 22.8 |

EXAMPLES 12 THROUGH 16

Still another batch of pigments was prepared from the recipes given in weight percent in Table E. All elements were present in the resulting pigments as oxides as a result of the calcination by which the pigments were prepared. The lowermost line of Table E shows the molar ratios of the compounds of the indicated elements that were added to the titania-supporting lattice.

TABLE E

| Example | 12 | 13 | 14 | 15 | 16 |
|---|---|---|---|---|---|
| $TiO_2$ | 75.65 | 62.60 | 76.80 | 73.60 | 67.20 |
| $NiCO_3$ | 7.48 | 7.48 | 5.54 | 5.54 | 5.54 |
| $Cb_2O_5$ | 12.52 | 12.52 | 14.46 | 14.46 | 14.46 |
| $SrCO_3$ | 4.35 | 17.40 | 3.20 | 6.40 | 12.80 |
| Molar ratio: Ni:Cb:Sr | 1:0.8:0.5 | 1:0.8:2 | 0.8:1:0.5 | 0.8:1:1 | 0.8:1:2 |

Table F provides the test values for these examples as follows:

TABLE F

| Example: | X | Y | Z | $x$ | $y$ | L | $-a$ | $+b$ |
|---|---|---|---|---|---|---|---|---|
| 12 | 0.7611 | 0.8363 | 0.4934 | 0.3640 | 0.3999 | 91.1 | 8.2 | 31.0 |
| 13 | 0.7608 | 0.8314 | 0.5227 | 0.3597 | 0.3931 | 90.6 | 7.5 | 28.8 |
| 14 | 0.7719 | 0.8497 | 0.5078 | 0.3624 | 0.3990 | 91.8 | 8.8 | 30.8 |
| 15 | 0.7696 | 0.8487 | 0.5164 | 0.3605 | 0.3975 | 91.9 | 9.1 | 30.2 |
| 16 | 0.7762 | 0.8542 | 0.5277 | 0.3596 | 0.3958 | 92.1 | 8.7 | 29.9 |

EXAMPLES 17 THROUGH 24

These examples disclose additional batch recipes of pigments of the present invention as summarized by Table G. In particular, these examples illustrate additional compounds that can be added to the rutile-type base and color-inducing oxides to replace part of the rutile-type lattice. The last two lines of Table G provide the molar ratios of the compounds of the elements added to the titania lattice in which X represents the metal in the recipe listed after columbium.

TABLE G

| Example | 17 | 18 | 19 | 20 | 21 | 22 | 23 | 24 |
|---|---|---|---|---|---|---|---|---|
| $TiO_2$ | 64.00 | 68.38 | 75.20 | 77.62 | 80.00 | 80.00 | 80.00 | 80.00 |
| $NiCO_3$ | 7.48 | 7.48 | 7.48 | 7.48 | | | | |
| $Cb_2O_5$ | 12.52 | 12.52 | 12.52 | 12.52 | 13.54 | 13.96 | 12.72 | 10.64 |
| $CaCO_3$ | 5.90 | | | | | | | |
| $BaCO_3$ | | 11.62 | | | | | | |
| $ZnO$ | | | 4.80 | | | | | |
| $MgO$ | | | | 2.38 | | | | |
| $CoCO_3$ | | | | | 6.46 | | | |
| $MnCO_3$ | | | | | | 6.04 | | |
| $Cr_2O_3$ | | | | | | | 7.28 | |
| $NH_4VO_3$ | | | | | | | | 9.36 |
| Molar ratio: | | | | | | | | |
| Ni | 1:0.8:1 | 1:0.8:1 | 1:0.8:1 | 1:0.8:1 | | | | |
| Cb:X | | | | | 1:1 | 1:1 | 1:1 | 1:1 |

EXAMPLES 25 THROUGH 31

In these examples, two of the present pigments, Examples 25 and 26, were compared with other commercially available pigments, Examples 27 through 31, that were based on another system, namely, an antimony system. Example 25 consisted of 80% rutile titania and 20% of nickel oxide and columbium oxide present in a molar ratio of 1:0.8, nickel oxide to columbium oxide. Example 26 consisted of 71.3% rutile titania and 28.7% of nickel oxide, columbium oxide, and strontium oxide, the last three oxides being present in a molar ratio of 1:0.8:1. All of the pigments of Examples 27 through 31 were titania-based and contained nickel and antimony oxides.

The pigment of each example was tested for tristimulus and Hunter values by the same tecehnique, both as to masstone and letdown. In the masstone test, two grams of pigment were uniformly mixed with 200 grams of clear polystyrene and standard test chips then molded from the pigmented polystyrene. The test chips were then subjected to standard procedures for determining the tristimulus and Hunter values. The letdown tests were carried out in a like manner as the masstone tests, except that one gram of the test pigment was replaced with one gram of rutile titania. Table H provides the Hunter values for these examples.

TABLE H

| Example | 25 | 26 | 27 | 28 | 29 | 30 | 31 |
|---|---|---|---|---|---|---|---|
| Masstone | | | | | | | |
| L | 83.1 | 84.5 | 85.2 | 77.6 | 80.4 | 84.1 | 78.2 |
| $-a$ | 8.9 | 10.2 | 9.4 | 8.7 | 9.4 | 9.2 | 8.4 |
| $+b$ | 38.3 | 38.6 | 36.4 | 38.0 | 38.9 | 32.9 | 38.0 |
| Letdown | | | | | | | |
| L | 89.0 | 90.2 | 89.3 | 88.2 | 89.3 | 89.3 | 87.7 |
| $-a$ | 8.5 | 9.2 | 8.9 | 8.3 | 8.6 | 7.8 | 8.0 |
| $+b$ | 28.6 | 28.7 | 28.5 | 28.4 | 27.8 | 24.5 | 27.9 |

The pigments of the present invention are at least equal to and in some cases superior to the antimony-containing pigments.

For purposes of comparison, all of the pigment compositions given are based on titania-containing pigments. However, the titania can be replaced by any of the rutile-type lattices previously disclosed.

Although the foregoing describes several embodiments of the present invention, it is understood that the invention may be practiced in still other forms within the scope of the following claims.

I claim:

1. A pigment free of heavy metals comprising a substantially ternary system consisting essentially of up to 99% by weight of a rutile-type supporting lattice, and a balance of color-inducing metal oxides consisting essentially of an oxide of columbium in combination with an oxide of a transitional element selected from the group consisting of nickel, chromium, cobalt, manganese, vanadium, and mixtures thereof, said oxides of columbium and the transitional element being present, respectively, in a molar ratio within the range of about 0.2 to about 5.

2. The pigment of claim 1 in which said rutile-type supporting lattice is selected from a group consisting of $TiO_2$, $SnO_2$, $\beta$-$MnO_2$, $PbO_2$, $VO_2$, $GeO_2$, $TeO_2$, $CrO_2$, $RuO_2$, $OsO_2$, $Ir_2$, $MgF_2$, $ZnF_2$, $MmF_2$, $FeF_2$, $CoF_2$, $NiF_2$, $PdF_2$, $LiSb_3O_8$, $MgSb_2O_6$, $ZnSb_2O_6$, $FeSb_2O_6$, $CoSb_2O_6$, $NiSb_2O_5$, $CuSb_2O_6$, $AlSbO_4$, $GaSbO_4$, $VSbO_4$, $CrSbO_4$, $FeSbO_4$, $RhSbO_4$, $MgTa_2O_6$, $NiTa_2O_6$, $CoTa_2O_6$, $FeTa_2O_6$, $CrTaO_4$, $FeTaO_4$, $RhSaO_4$, $CrNbO_4$, $FeNbO_4$, $RhNbO_4$ and $RhVO_4$.

3. The pigment of claim 1 in which said rutile-type supporting lattice is titania.

4. The pigment of claim 1 in which said pigment comprises about 70% to about 90% by weight of said lattice, and about 10% to about 30% by weight of said color-inducing oxides.

5. The pigment of claim 1 in which said lattice is titania; said transitional element is nickel, and the pigment has a yellow color.

6. The pigment of claim 1 in which said lattice is titania, said transitional element is chromium, and the pigment has an orange color.

7. The pigment of claim 1 in which said lattice is titania, said transitional element is cobalt, and the pigment has a buff orange color.

8. The pigment of claim 1 in which said lattice is titania, said transitional element is manganese, and the pigment has a maroon color.

9. The pigment of claim 1 in which said lattice is titania, said transitional element is vanadium, and the pigment has a black color.

10. The pigment of claim 1 in which said oxide of columbium and said oxide of a transitional element are present, respectively, in a molar ratio of about 0.2 to about 0.8 mole of columbium oxide per mole of transitional elemental oxide.

11. The pigment of claim 1 in which said oxide of columbium and said oxide of a transitional element are present in a molar ratio of about one mole of columbium oxide to about 0.8 to about 0.2 mole of transitional elemental oxide.

12. The pigment of claim 1 further including up to about 20 weight percent of the rutile-type lattice of an oxide selected from a group consisting of the oxide of barium, magnesium, strontium, zinc, calcium, and mixtures thereof.

13. A yellow pigment comprising a substantially ternary oxide system consisting essentially of a titania supporting lattice and color-inducing metal oxides within said lattice, said metal oxides consisting essentially of columbium oxide and nickel oxide pesent, respectively, in a molar ratio within the range of about 0.2 to about 5.

14. The yellow pigment of claim 13 containing strontium oxide up to about 20 weight percent of the titania.

References Cited

UNITED STATES PATENTS 3,022,186  2/1962  Hurd _____ 106—300
3,091,544  5/1963  Hurd et al. _____ 106—288 B DELBERT E. GANTZ, Primary Examiner J. V. HOWARD, Assistant Examiner